United States Patent [19]

Evans et al.

[11] Patent Number: 4,637,948
[45] Date of Patent: Jan. 20, 1987

[54] TUFTED WEATHERSTRIPPING WITH BARRIER FIN

[76] Inventors: Robert D. Evans, 44 Tubbs Springs Dr., Weston, Conn. 06883; Robert C. Blezard, 29 Homestead St., North Smithfield, R.I. 02895

[21] Appl. No.: 640,666

[22] Filed: Aug. 14, 1984
(Under 37 CFR 1.47)

[51] Int. Cl.$^4$ ............................................. D04H 11/00
[52] U.S. Cl. .................................... 428/89; 156/72; 156/435; 428/85; 428/92; 428/95; 428/96; 428/97
[58] Field of Search .................. 428/85, 92, 89, 95, 428/96, 97; 156/72, 435; 49/475, 489

[56] References Cited

U.S. PATENT DOCUMENTS

| | | | |
|---|---|---|---|
| 3,175,256 | 3/1965 | Horton | 428/92 |
| 3,404,487 | 10/1968 | Johnson | 428/92 |
| 3,745,053 | 7/1973 | Johnson et al. | 428/92 |
| 3,923,576 | 12/1975 | Lind | 428/92 |
| 3,935,043 | 1/1976 | Kessler | 428/92 |

Primary Examiner—Marion E. McCamish
Attorney, Agent, or Firm—Edward D. C. Bartlett

[57] ABSTRACT

A method and apparatus for tufting weatherstripping involves forming a barrier fin on a substrate, advancing the substrate with the barrier fin extending downwardly from the underside thereof past a tufter head, and passing the downwardly extending barrier fin through a channel in the needleplate of the tufter head while the substrate passes over and is supported by the needleplate. A row of tufts is then tufted along one or both sides of the barrier fin. The barrier fin may be formed by folding the substrate, adhering a strip to the underside of the substrate, or by forming a film from a row of previously inserted tufts. Preferably, the substrate is guided transversely to ensure alignment of the barrier fin or fins between the rows of tufts.

20 Claims, 30 Drawing Figures

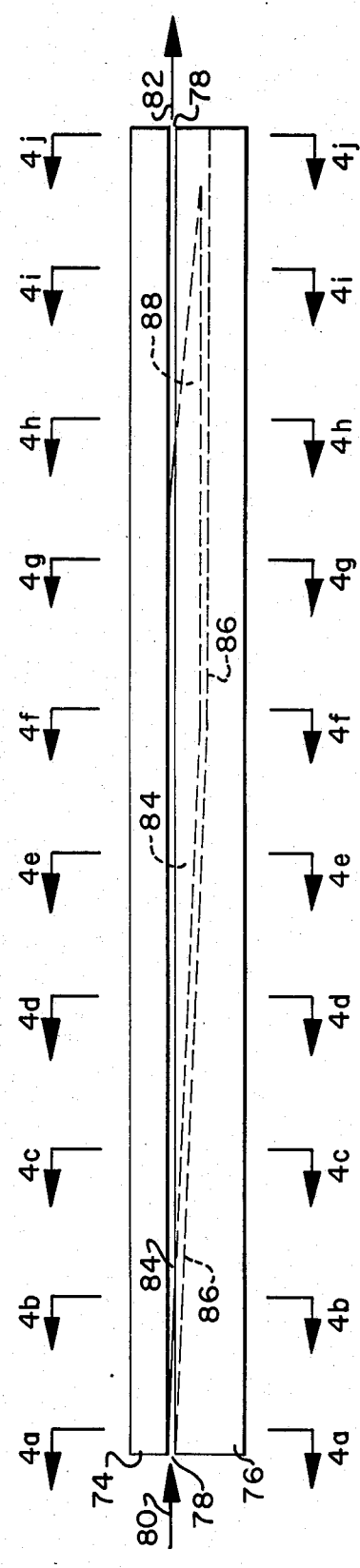

TUFTED WEATHERSTRIPPING WITH BARRIER FIN

FIELD OF THE INVENTION

This invention relates to pile weatherstripping having one or more barrier fins and in which the pil is formed by tufting.

BACKGROUND OF THE INVENTION

Weatherstripping in the form of a strip of substrate having one or more rows of pile upstanding therefrom is well known. It is employed to mitigate ingress of air, moisture and water through the clearance between a door or window and the surrounding frame structure on which the door or window is mounted and movable relative to during opening and closing. It is also known to incorporate a barrier fin in such weatherstripping, either between two rows of pile or on one or both sides of the pile, see for example U.S. Pat. Nos. 3,175,256; 3,404,487; 3,745,053; 3,923,576; and 3,935,043.

Various ways of forming these barrier fins have been suggested in the above patents. In U.S. Pat. No. 3,175,256 it has been proposed that a central barrier fin can be formed before or after the rows of pile are formed. When forming the barrier fin before forming the pile, it is suggested that the barrier fin can be formed integrally with the substrate, either as an integrally formed strip of inverted T-shape or by making a fold in the substrate and adhering the sides of the fold together. In either case, the rows of pile on each side of the preformed barrier fin are then formed by flocking.

Forming pile by tufting is believed to offer improved economics for manufacturing weatherstripping. However, heretofore it has not been possible to attach pile by tufting after formation of a barrier fin. Known tufting techniques such as employed in the production of carpets, bedspreads etc., if applied to weatherstrip manufacturing would necessitate formation of the barrier fin after tufting.

SUMMARY OF THE INVENTION

It is an object of the present invention to produce weatherstripping by tufting after formation of the barrier fin or fins.

A feature by which this is achieved is the provision of a channel in the tufter's needleplate and passing a downwardly extending barrier fin through this channel. This has the advantage that a row of tufts can be inserted on either side of the barrier fin, as close to the barrier fin as desired, and that the needleplate still supports the substrate during the tufting operation. Further, by forming the barrier fin before tufting, more space is made available in which to form the barrier fin, enabling the barrier fin to be formed more accurately. Also, barrier fin formation is not complicated by the presence of pile fibers, this allowing other methods of forming the barrier fin to be used.

Accordingly, therefore, there is provided by the present invention a method of manufacturing weatherstripping comprising forming a barrier fin on a substrate, advancing the substrate with the barrier fin extending downwardly from the underside thereof past a tufter head having support means for suppoiting the substrate during tufting, passing the downwardly extending barrier fin through a channel in said support means while the substrate passes over and is supported by said support means, and tufting a row of tufts in the supported substrate along at least one side of the downwardly extending barrier fin.

Preferably, the substrate is guided transversely to its direction of travel to ensure alignment of the barrier fin with the needle bar of the tufter, particularly when a row of tufts is being inserted on each side of the barrier fin. Such transverse guiding may be at locations upstream and/or downstream of the tufter head.

The barrier fin may be formed by folding the substrate. Preferably opposite edges of the substrate are gripped in a tenter frame and caused to converge towards each other in controlled manner during this folding operation.

The barrier fin may be formed by adhering a strip of sheet material to the underside of the substrate. This strip may be supplied pre-folded, or folded immediately prior to being adhered.

There is also provided by the present invention apparatus for manufacturing the weatherstripping comprising a tufter head having at least one needle and support means for supporting substrate during tufting, means for advancing the substrate past the tufter head, said support means having a channel therein to accommodate a barrier fin extending downwardly from the underside of the substrate, and said needle being disposed to tuft alongside the barrier fin.

The channel is preferably a groove, but may be a slot completely through the support means which would divide the support means into a plurality of discrete parts.

The support means may be a thick needleplate with grooves or slots therein extending from the leading edge to the trailing edge.

According to another aspect of the present invention there is provided a weatherstripping product comprising a strip a substrate having a barrier fin extending therefrom, a resilient row of pile attached to the substrate and extending along each side of the barrier fin, and the barrier fin comprising sheet material folded upon itself and enveloping a core spaced from and extending parallel to the substrate. The rows of pile are shorter in height than the barrier fin and engage under the enlargement to resiliently support it in position. Preferably the core is cylindrical and made of resilient foam.

Other objects, features and advantages of the present invention will become more fully apparent from the following detailed description of the preferred embodiments, the appended claims and the accompanying drawings.

BRIEF DESCRIPTION OF THE DRAWINGS

In the accompanying drawings:

FIG. 3 is a side elevation on a larger scale of one of the folding stations in the apparatus of FIG. 1;

FIGS. 4a to 4j are sections on the lines 4a—4a to 4j—4j, respectively, in FIG. 3;

DETAILED DESCRIPTION OF THE PREFERRED EMBODIMENTS

FIGS. 1 to 6 show one embodiment of the apparatus according to the invention.

Figure 1:
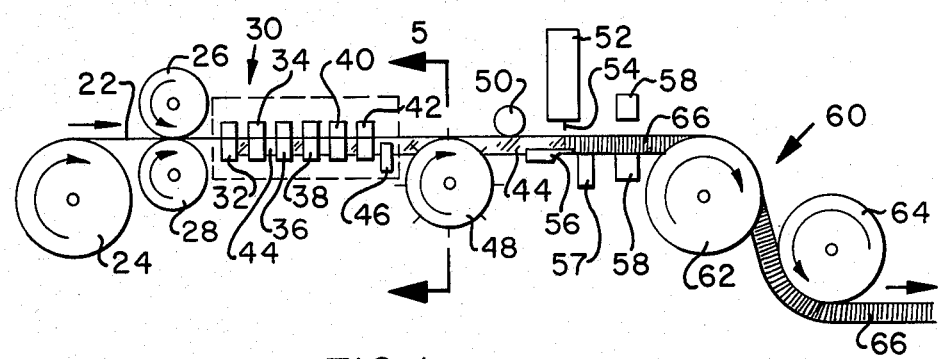
FIG. 1 is a diagrammatic elevational view of an apparatus according to the invention and for carrying out the method of the invention.

FIG. 1 shows substrate or primary backing 22 being drawn from a supply roll 24 and passing between a pair of smoothed surfaced driven nip rolls 26, 28. Immediately downstream from the nip rolls 26, 28 the side edges of the substrate 22 are gripped in a tenter frame 30, the location of which is schematically shown by broken lines. The tenter frame 30 feeds the substrate 22 through a series of transversely staggered folding stations 32 to 42 which fold the substrate 22 to form a series of downwardly extending, spaced apart parallell folds 44. Downstream of the last folding station 42, and just prior to leaving the tenter frame 30, a transverse row of spaced apart ultrasonic welders 46 are arranged to weld the two sides of each fold 44 together. A grooved spiked roll 48 engages the underside of the substrate 22 between the folds 44 and, in association with a smaller idler roll 50 engaging the upper surface of the substrate, feeds the pre-folded substrate to a tufter head 52. The tufter head 52 has a row of needles 54, which cooperate with a needleplate 56 supporting the substrate 22 and an associated looper and cutter mechanism 57, for inserting parallel spaced apart rows of tufted pile 66 in the substrate 22. The folded and tufted substrate 22 is drawn from the tufting head 52 by an edge guiding system 60. The edge guiding system 60 comprises an edge sensing unit 58, an idler roll 62 engaging the lower surface of the substrate 22, and a driven roll 64 engaging the upper surface of the substrate. The sensor 58 reacts to either a datum mark on the substrate 22 or one of the lateral edges thereof to cause the idler roll 62 and the driven roll 64 to adjust and control the lateral position of the moving substrate 22. This ensures that the folds 44 inserted in the substrate are positioned in accurate lateral spaced relationship to the rows of tufts inserted by the needles 54. This lateral position controlling means 60 can be constructed in accordance with any of the systems known for performing this function, for example the HYDRALIGN (trademark) servo hydraulic edge guide system sold by Hydralign Inc. of Walpole, Mass. under their catalog no. A.D.C. 4685.

Figure 2:
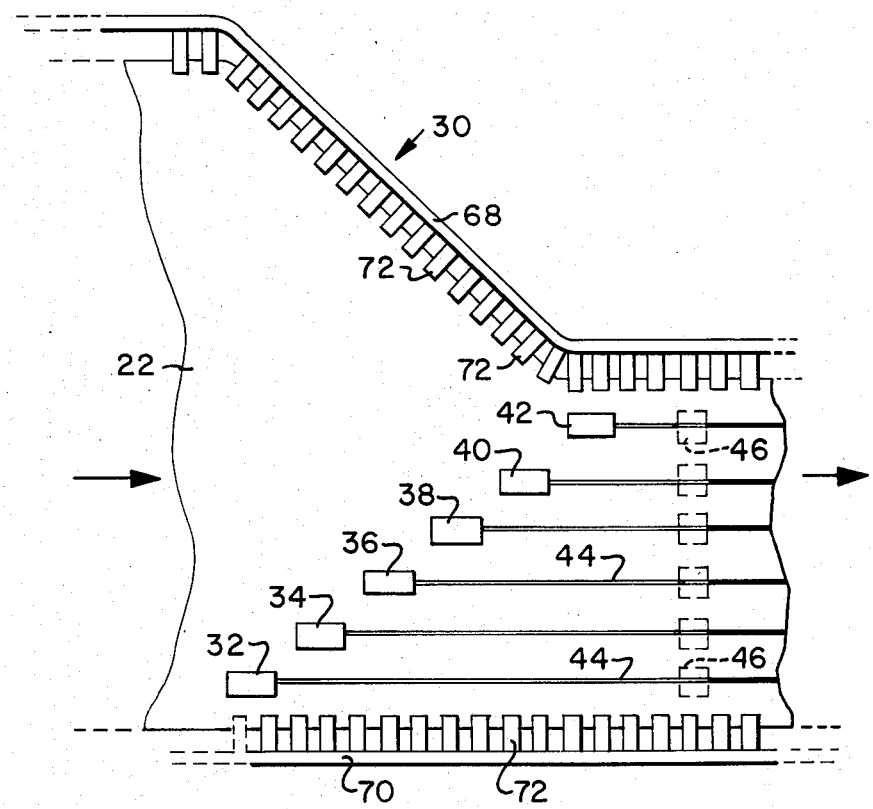
FIG. 2 is a plan view from above of a portion of the apparatus of FIG. 1.

FIG. 2 shows a plan view of the tenter frame portion of the apparatus of FIG. 1. The folding stations 32 to 42 can be seen spaced in echelon across part of the original width of the substrate 22. The upper portion of a fold 44 can be seen extending downstream from each of the folding stations. Also downstream from the folding stations can be seen the transverse row of ultrasonic welders 46 through which the folds 44 pass, the welders 46 being shown in broken lines as they are located below the substrate 22. The tenter frame 30 comprises a pair of rails 68, 70 along which are driven a plurality of edge gripping clips 72. The clips 72 grip opposing edges of the substrate 22 in non-slip manner and are constructed in a form that is well known in the tenter frame art. The rail 70 adjacent the first folding station 32 is straight, however, the rail 68 adjacent the opposite edge the substrate 22 is shaped as shown. The rail 68 starts parallel to the rail 70, but then converges towards the rail 70 as material is consumed from the sheet of substrate 22 to progressively form the series of folds 44. Once all the folds 44 are formed, the rail 68 then again extends parallel to the rail 70. The row of welders 46 extend traversely between parallel portions of the rail 68, 70.

FIG. 3 shows in greater detail a side elevational view of any one of the folding stations 32 to 42. The folding station has a top die 74 aligned over a bottom die 76. Both dies 74, 76 are elongate and spaced apart a small clearance 78 to accommodate the substrate 22 therebetween. The substrate enters between the two dies 74, 76 in the direction of the arrow 80 and exits in the direction of the arrow 82. The upper die 74 has progressively extending downwardly from it in the direction of travel of the substrate, a rib-like projection 84. About half way along the die 74, the rib 84 reaches its maximum depth and then it extends parallel to the top of the die 74. About the last third of the downstream portion of the rib 84 parts from the main body of the die 74 and forms a tapered tail 88. The lower die 76 has a cavity 86 formed therein which accommodates the rib 84 with a small clearance between the cavity and the rib to allow passage of the substrate 22.

FIGS. 4a to 4j show cross sections of the pair of dies 74, 76 and are taken on the section lines 4a—4a to 4j—4j of FIG. 3 at succesive locations in the direction of travel of the substrate 22. As can be seen from FIG. 4a, the dies 74, 76 start as flat blocks parallel to each other with the small clearance 78 therebetween. Then, the projection 84 commences and progressively grows longer until it reaches its maximum size in FIG. 4f. At the same time, the cavity 86 in the lower die 76 grows correspondingly to maintain the same small clearance between the projection 84 and the cavity 86. Thereafter the cavity 86 stays at the same depth but starts to neck at the top. The rib 94 also starts to neck at its top, and as can be seen in FIG. 4g has a somewhat diamond shaped cross section before the tapered tail portion 88 of the rib separates from the upper die 74 as can be seen in FIGS. 4h and 4i. As the tail portion 88 of the rib diminishes in cross section the cavity becomes more slot-like with parallel side walls until the configuration shown in FIG. 4j is reached and the tail 88 is terminated. Thus, the substrate 22 enters between the pair of dies 74, 76 in the direction of the arrow 80 as a flat sheet, and leaves the dies 74, 76 in the direction of the arrow 82 as a flat sheet having a folded portion downwardly extending therefrom. This folded portion will have the same configuration and dimensions as the cavity 86 in FIG. 4j. It will be appreciated, that as the folded portion is progressively formed, sheet material of the substrate 22 is progressively drawn in sideways between the dies 74, 76. This material to form the fold can either be drawn from both sides of the dies simultaneously, or from one side or the other only. With the arrangement of the dies shown in FIG. 2, and with the lower edge of the substrate 22 anchored by the straight tenter frame rail 70, material will be drawn in between the dies 74, 76 only from the right hand side in FIGS. 4a through 4j. As the folds 44 are progressively formed in FIG. 2, it may be desirable to stabilize the dimensions of each fold 44 as it is formed. This can conveniently be achieved by heat sealing the fold at the neck 90 in the lower die 76 in FIG. 4h, or at the neck 92 in the die 76 in FIG. 4i.

Figure 5:
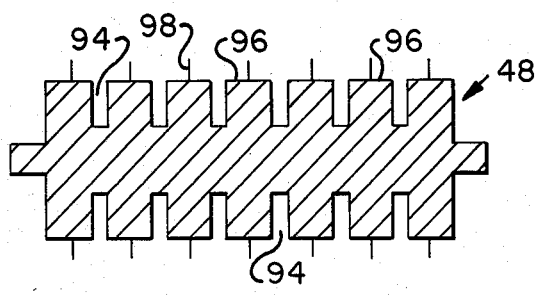
FIG. 5 is a section on the line 5—5 of FIG. 1 of a spiked feed roller.

FIG. 5 shows a cross section on the line 5—5 in FIG. 1 of the spiked roller 48 which has formed therein a series of annular grooves 94. The grooves 94 have a depth just greater than the depth of the folds 44, and are narrow in width. The grooves 94 are aligned to accommodate the folds 44 therein as the substrate 22 passes over and is advanced by the spiked roller 48. The disk-like portions 96 between the grooves 94 contact the lower side of the substrate 22, and spikes 98 extending from the disk-like portions 96 engage through the substrate.

Figure 6:
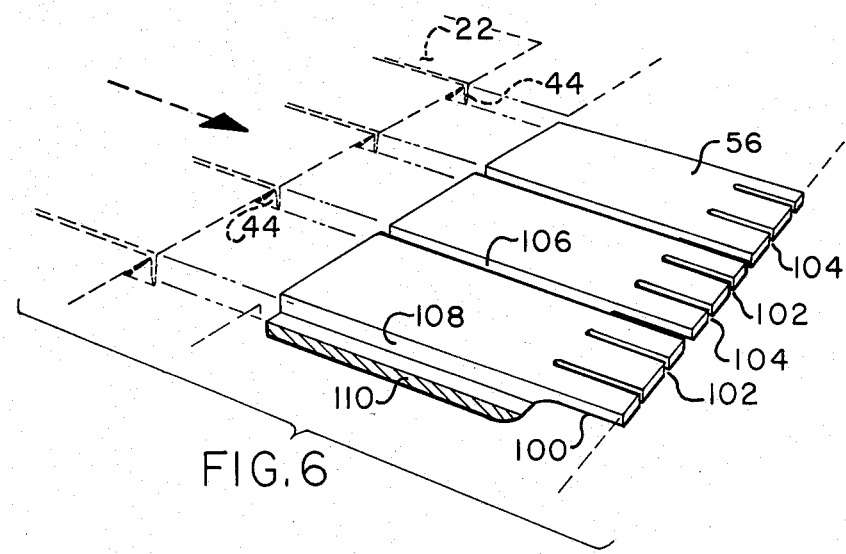
FIG. 6 is a fragmentary perspective view from above of the needleplate of the tufter of the apparatus of FIG. 1.

FIG. 6 shows in perspective view, and partly in section, a portion of the needleplate 56 which has a thin trailing edge portion 100 containing pairs of slots 102, 104 through which the needles 54 of the tufting head 52 reciprocate. Between each pair of slots 102, 104 a groove 106 extends across the full width of the needleplate parallel to the direction of travel of the substrate 22. The grooves 106 have side walls 108 which have a depth just greater than the depth of the folds 44, the integrity of the plate 56 being maintained by the section of metal 110 below each groove 106. The needleplate 56 supports the lower surface of the substrate 22 as the substrate passes through the tufting head 52. The grooves 106 accommodate passage of the folds 44 through the needleplate 56 enabling a row of tufts to be inserted through the slots 102, 104 on each side of each fold 44. The substrate 22 with folds 44 aligned with the grooves 106 is shown in broken lines on the left in FIG. 6. In order to obtain sufficient strength in the section 110, the needleplate 56 may need to be thicker than needleplates normally used in the tufting art, and if the narrow width grooves 106 are to have sufficient depth to accommodate deep folds 44, then the needleplate 56 would have substantial thickness.

In operation a sheet of substrate 22 is drawn from the supply roll 24 and fed through the apparatus by the nip rolls 26, 28, the spiked roll 48, and the guide roll 64, all of which are driven at the same peripheral speed. As the substrate 22 passes through the series of folding stations 32 to 42, the number of which is chosen depending upon the number of folds to be made and the overall width of the substrate 22, folds 44 are progressively formed in the substrate 22 with a progressive diminishing of the overall width of the substrate. The sides of each fold 44 are then welded together as the folds pass through the ultrasonic welders 46 to form barrier fins. These barrier fins, or welded folds 44, pass through the grooves 106 in the needleplate 56, the latter supporting the substrate 22 as a row of tufts is inserted on each side of each welded fold 44. The looper and cutter mechanisms 57 may be set to produce looped pile or cut pile. One outer edge of the substrate 22 passes between the edge sensor 58, signals from which control the position of the guide rolls 62, 64 to maintain the welded folds 44 in alignment with the grooves 106 in the needleplate 56. The roller 62 is formed with a series of annular grooves around the surface thereof, these grooves being similar to and aligned with the grooves 94 of the roller 48. The grooves in the roller 62 are similar to those shown in FIG. 5, except substantially wider to accommodate not only a welded fold 44 but also a row of tufted pile 66 on each side thereof. Thereafter, a secondary backing is attached to the upper surface of the folded and tufted substrate 22, and then the substrate slit midway between each pair of adjacent folds 44 to form a plurality of strips of weatherstripping each having a center barrier fin with a row of pile on each side thereof. Such slitting is preferably performed ultrasonically. If desired, the fold welders 46 may be located immediately after the respective folding station so that a fold 44 is welded into a barrier film before formation of the adjacent fold 44 commences. Also, before applying the secondary backing to the folded and tufted substrate, it is preferable to deform and flatten the tuft "knuckles" or stitches formed along the upper surface of the substrate during tufting. Such knuckle deforming and flattening reduces the thickness of the base of the final weatherstripping product, and can be effected by applying pressure and heat to these knuckles, for example by means of a heated grooved roller or by heated resilent fingers.

The substrate 22 may be a non-woven fabric including spun-bonded fabrics, or a woven fabric. A suitable spun bonded fabric would be similar to TYPAR (trademark) made by DuPont De Nemours EI & Co. of Wilmington, Del. and having a weight of about three ounces or more per square yard. If a woven fabric is used, then preferably it should be woven from conjugate fibers, including ribbons, having a polypropylene core and a surrounding polyethylene sheath. With such conjugate fibers the weld can be made with the lower melting point component, that is the polyethylene. Any suitable face yarn can be used to form the rows of tufted pile, such as nylon or polyester, but preferably texturised multi-filament polypropylene yarn having a UV stabiliser and silicone additive is used. Conjugate yarns may also advantageously be used as face yarns. The secondary backing may be a spun bonded fabric, a woven fabric, a sheet and laminated with adhesive to the substrate; alternatively, the secondary backing could be a layer of hot melt or a low melting polymer.

Figure 7:
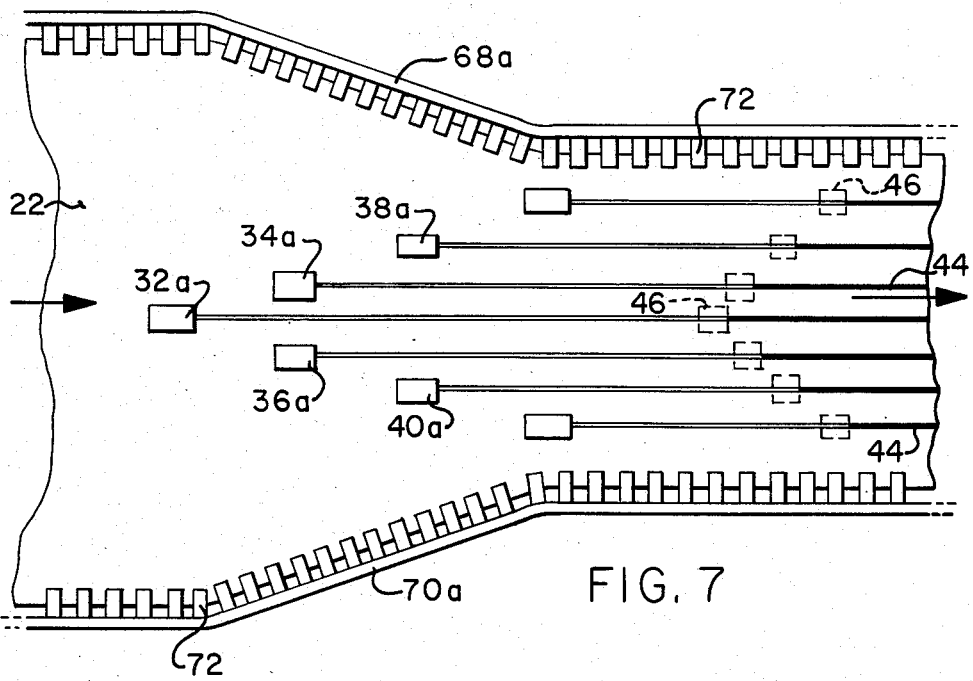
FIG. 7 is a plan view similar to FIG. 2 of a modification of the apparatus of FIG. 1.

FIG. 7 corresponds to FIG. 2, but shows a modification of the layout of the folding stations 32a, 34a, 36a etc., and the clip tenter frame 68a, 70a. In this modification of the apparatus of FIG. 1, the first fold 44 is formed in the center of the substrate 22 by the leading folding station 32a, and then successively pairs of folds 44 are formed on each side thereof by pairs of folding stations 34a, 36a, etc., each successive pair being further from the center. As can be seen, the folding stations form a V extending outwardly and rearwardly from the upstream centrally located folding station 32a. The welding stations 46 are also formed in a corresponding V shaped configuration. The tenter frame rails 68a, 70a both converge equally from a location level with the first folding station 32a to a location level with the last pair of folding stations. With this arrangement, to form the folds 44, material of the substrate 22 is fed into the first folding station 32a from both sides, and then in the subsequent downstream folding stations material of the substrate 22 is fed in from the outside only. Althought the welders 46 in the embodiments of both FIG. 2 and FIG. 6 are preferably ultrasonic, they could be formed as heated dies.

A second embodiment of the invention will now be described with reference to FIGS. 8 and 9.

Figure 8:
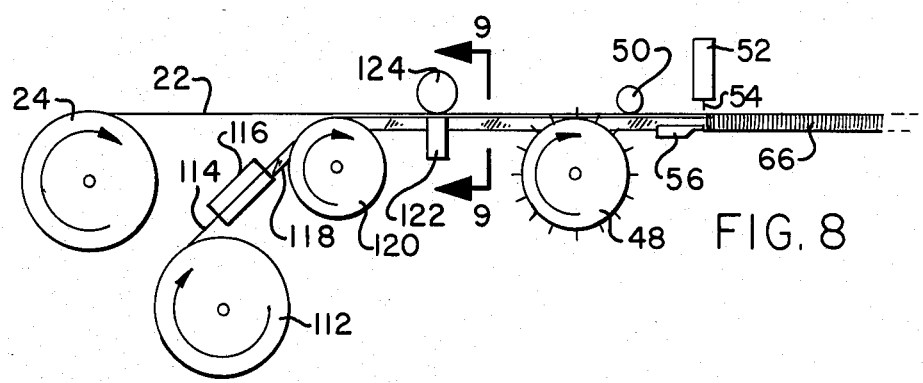
FIG. 8 is a diagrammatic side elevational view of another apparatus according to the invention and for carrying out the method of the invention.
Figure 9:
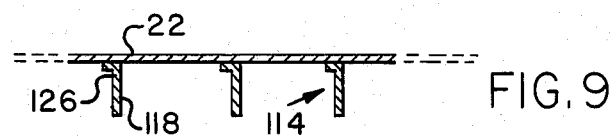
FIG. 9 is a fragmentary section on the line 9—9 of FIG. 8.

FIG. 8 illustrates an apparatus similar to FIG. 1 except for the manner in which the barrier fins are formed. Parts in FIG. 8 that are the same as those in FIG. 1 are designated by the same reference numerals. With this embodiment, instead of forming the barrier fins by folding the substrate, the barrier fins are formed by attaching individual strips to the underside of the substrate 22. To achieve this, immediately downstream from the supply roll 24 of substrate is disposed a supply roll 112 carrying in side by side relationship a plurality of strips 114 of film. The supply roll 112 is disposed below the substrate 22 and the strips 114 are drawn upwards therefrom through a plurality of folding stations 116 by a grooved driven roller 120. The folded strips are positioned against the underside of the substrate 22 by the grooved roller 120, and then welded to the substrate as each strip passes between a horn 122 and anvil 124 of an ultrasonic welder. The substrate 22 with the folded strips 118 welded thereto is then advanced by the driven spiked roll 48 to the tufting head 52, the downwardly extending portions 118 of the folded strips being accommodated in the grooves 94 (see FIG. 5) of the roll 48, and also being accommodated in the grooves 106 (see FIG. 6) of the needleplate 56. The tufting head 52 then inserts a row of tufts 66 on each side of each folded strip portion 118. These portions 118 form barrier fins and the production of the weatherstripping is completed as previously described in relation to the embodiment of FIGS. 1 through 6.

The folding stations 116 extend in a row transversely below the substrate 22, there being one such station for each separate strip 114 to be folded and applied to the substrate. During passage through the folding stations 116, the flat strips 114 are folded in the form of an L, and preferably are heat set in this configuration. FIG. 9 is a partial section on the line 9—9 of FIG. 8 and shows the folded strips 114 attached to and extending downwardly from the substrate 22, each strip having the base portion 126 of the L welded to the substrate and having the upright portion 118 of the L extending downwardly to form a barrier fin. The roller 120 is formed the same as the roller 48 shown in FIG. 5, except the spikes 98 are omitted. The thin annular grooves in the rollers 120 and 48, and the thin through grooves 106 in the needleplate 56 are aligned, and the alignment of the downwardly extending portions 118 of the folded strips through these grooves is controlled by the edge guiding system 60 of FIG. 1.

In a modification of this embodiment, the strips 114 can be separately pre-folded, heat set, and then wound flat in folded form on the supply roll 112. Thereafter, these pre-folded strips are unwound from the supply roll 112 and unfolded to L-shaped as they pass through the forming stations 116, this unfolding being accompanied by re-heating to aid the extending portions 118 to remain perpendicular to the substrate 22. Preferably, the strips 114 are formed from polypropylene film having a thickness of approximately three thousandths of an inch. By attaching the strip-like barrier fins to the substrate before inserting the rows of pile, it will be appreciated that there is more space for controlling the accurate formation of the barrier fin, including the height and the exact location thereof.

Figure 10:
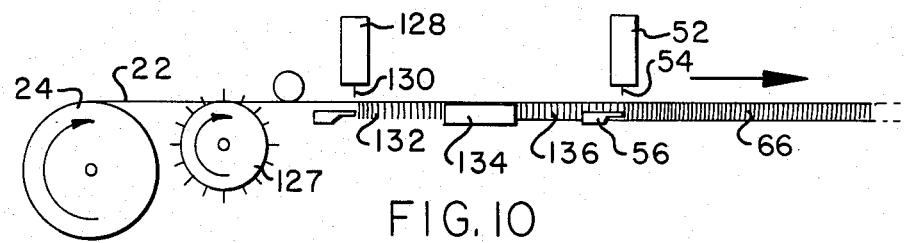
FIG. 10 is a diagrammatic side elevational view of a third apparatus according to the invention for carrying out the method of the invention.

FIG. 10 illustrates a third embodiment of the invention in which the barrier fins are formed from rows of pile inserted by a pre-tufting before the outside pile rows of the weatherstripping are inserted. The substrate 22 is drawn from the supply roll 24 by a driven spiked roll 127 and fed through a preliminary tufting head 128 having a row of needles 130 to form a series of parallel spaced apart rows of tufts 132. Each row of tufts 132 then passes between a pair of heated dies 134 (only one of which can be seen) and the row of tufts 132 thereby transformed with heat and pressure into a film 136. The films 136 extend downwardly from the substrate 22 and are attached thereto by the base of the tufts 132 and the tuft knuckles connecting the tufts on the upper side of the substrate. The substrate with the films 136 extending downwardly therefrom then passes through the tufting head 52, the films 136 engaging in and passing through the grooves 106 (see FIG. 6) in the needleplate 56, and the row of needles 54 inserting a row of tufts 66 on each side of each film 136. The production of the weatherstripping is then completed similarly as described above in relation to the embodiment of FIGS. 1 to 6, including using an edge guiding system to ensure alignment of the barrier fins 136 in relation to the needles 54 of the tufting head 52. To insert a row of pile 66 on each side of each barrier fin 136, the tufter head 52 has two needles 54 for each needle 130 of the preliminary tufting head 128, each needle 130 being aligned midway between the corresponding pair of needles 54. The rows of tufts 132 and 66 can be formed from the same fiber, such as multifilament polypropylene, nylon, or polyester, but preferably the rows 132 are formed from conjugate yarn and the row 66 from texturised multi-filament yarn. The conjugate yarn of the rows 132 is preferably a multi-filament yarn in which each filament has a central core of polypropylene surrounded by a sheath of polyethylene. With such conjugate yarn, the film 136 can be formed by heating the dies 134 to a temperature between the melting points of polyethylene and polypropylene so that the polyethylene melts and engulfs the polypropylene cores to form a fiber reinforced film.

Figure 11:
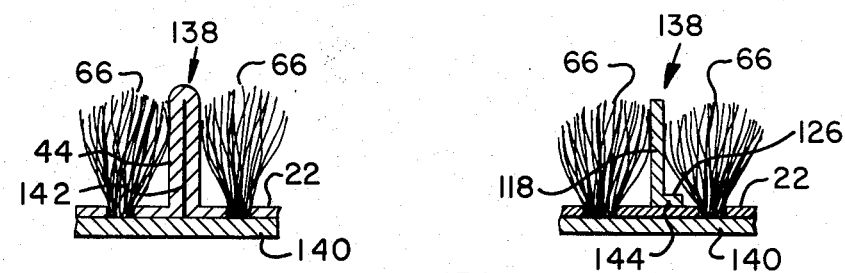
FIG. 11 is a cross section of a weatherstripping product produced by the apparatus of FIG. 1.
Figure 12:
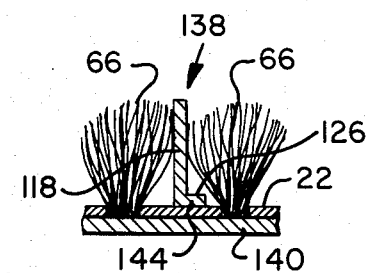
FIG. 12 is a cross section of a weatherstripping product produced by the apparatus of FIG. 8.
Figure 13:
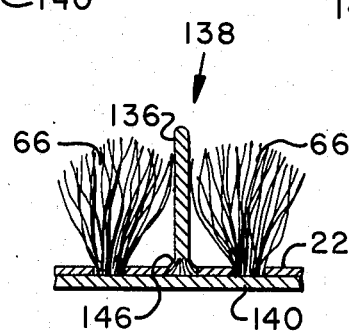
FIG. 13 is a cross section of a weatherstripping product produced with the apparatus of FIG. 10.

FIGS. 11, 12 and 13 show cross sections of a weatherstripping product made by the embodiments of FIGS. 1, 8, and 10 respectively. Each weatherstripping product has a central barrier fin 138 with a row of cut pile tufts 66 on each side thereof, these tufts extending through the substrate or primary backing 22 and being locked in position by a strip of secondary backing 140 laminated to the primary backing 22. In FIG. 11, the barrier fin 138 is formed by the process of FIGS. 1 to 6 and comprises a fold 44 upstanding from the substrate 22, the inside surfaces of the fold 44 being welded, or otherwise adhered, together at 142. The product of FIG. 12 is made by the process of FIGS. 8 and 9 and the barrier fin 138 comprises an L-shaped strip in which the smaller leg 126 of the L is welded at 144 to the substrate 22, and the longer leg 118 of the L extends upwardly from the substrate 22 to form the fin. The product of FIG. 13 is made by the process of FIG. 10 with the barrier fin 138 being formed by a film 136 made from a row of tufts and connected to the substrate 22 by the roots 146 of the original tufts.

Figure 14:
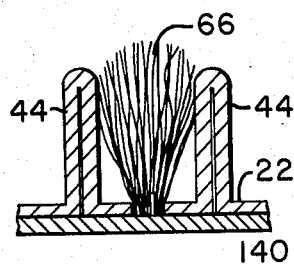
FIG. 14 is a cross section of another weatherstripping product produced with the apparatus of FIG. 1.

FIG. 14 shows a product made by a modification of the embodiment of FIGS. 1 to 6 and having a single central row of tufts 66 with a folded barrier fin 44 on each side thereof. To produce this product the folding stations 32 to 42 are arranged in staggered pairs and the needles 54 of the tufting head 52 aligned to insert a single row of tufts between the folds 44 formed by a pair of folding stations.

Figure 15:
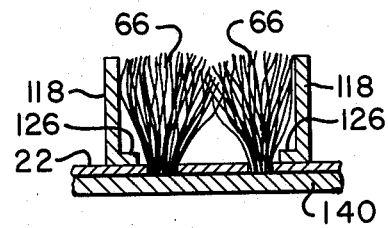
FIG. 15 is a cross section of another weatherstripping product produced with the apparatus of FIG. 8.

The product of FIG. 15 is formed by the embodiment of FIG. 8 by arranging the folding stations 116 to fold adjacent strips 114 in opposite directions, and for the needles 54 of the tufting head 52 to insert two rows of tufts 66 between each pair of folded strips 118, 126. With this arrangement, it is advantageous to orientate the base legs 126 of the L-shaped strips towards each other as shown. This gives the advantage that the base portions 126 do not interfere with the insertion of the weatherstripping into a lipped groove of a window or door frame member into which the weatherstripping is inserted.

Figure 16:
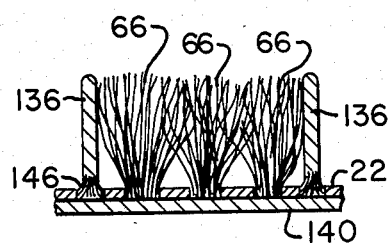
FIG. 16 is a cross section of another weatherstripping product produced by the apparatus of FIG. 10.

FIG. 16 shows a product made by the embodiment of FIG. 10 in which the preliminary tufting head 128 is arranged to have two needles 130 for every three needles 54 of the tufting head 52. Each set of three needles 54 of the tuftng head 52 is aligned between a pair of needles 130 of the preliminary tufting head 128. The pairs of heated dies 134, and the grooves 106 in the needleplate 56 are arranged so that pairs of tufted rows 132 inserted by the preliminary tufting head 128 are converted into pairs of films by the dies 134, and then three rows of pile 66 are tufted between each pair of films 136.

Figure 17:
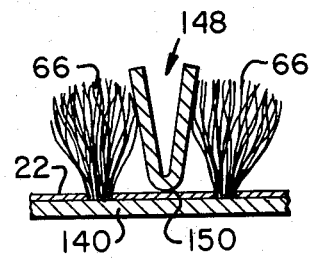
FIG. 17 is a cross section of a further weatherstripping product produced by the apparatus of FIG. 8.

FIG. 17 shows a product made by a modification of the embodiment of FIG. 8 and having a central barrier fin 148 of V form with a row of tufted pile 66 on each side. The barrier fin 148 is attached by a weld or adhesive 150 at its base to the substrate 22. To produce this product, the folding stations 116 in FIG. 8 are designed to fold the strips 114 into a V form. The attachment 150 can be made ultrasonically by the horn 122 and anvil 124 or by applying adhesive to the apex of the V or to the underside of the substrate 22. The two arms of the V could be unequal with the longer arm extending above the top of the tufted pile 66.

Figure 18:
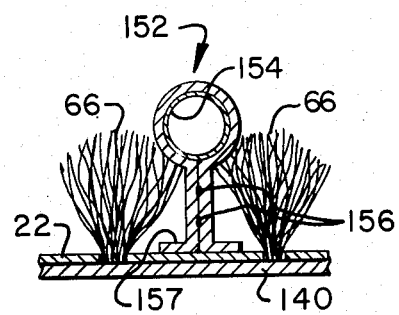
FIG. 18 is a cross section of a new weatherstripping product produced by a modification of the apparatus of FIG. 8.
Figure 19:
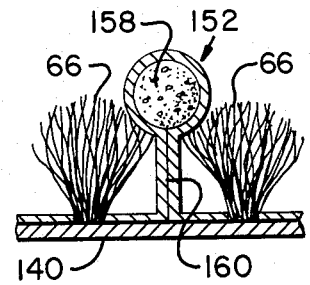
FIG. 19 is a cross section of a new weatherstripping product produced by a modification of the apparatus of FIG. 1.

FIGS. 18 and 19 show a new form of weatherstripping produced by modifications of the embodiments of FIGS. 8 and 1, respectively. This weatherstripping product has a central barrier fin with an enlargement 152 at the top. A row of pile 66 either cut as shown or looped, is disposed on each side of the barrier fin, the height of the rows of pile being less than that of the top of the enlargement 152 with the inner portions of the rows of pile engaging under the enlargement 152. The outside rows of pile 66 engaging under the enlargement 152 resiliently retain the enlargement in position and help return it to position after deflection during opening or closing of a window or door member to which the weatherstripping is attached. The upper curved surface of the enlargement 152 forms a sealing surface against the opposing window or door member being sealed, the curvature of this sealing surface facilitating easy sliding of the enlargement 152 relative to the member against which it seals. Also, the enlargement 152 is resilient and enables a substantial width of seal to be effectively made. To form the weatherstripping of FIG. 18, the folding stations 116 of FIG. 8 are modified to effect placement of a resilient hollow tube 154 on the center of the strip 114 with the strip 114 then being folded or wrapped around the tube 154 with the free edge portions of the strip coming together and forming a fin or web portion terminating in two opposing base portions. The two portions of the strip 114 forming the web portion are then welded together at 156 to retain the shape of the web and enlargement 152, and then the base portions 157 welded to the substrate 22 by the horn 122 with an associated pair of anvils 124. The tube 154 is preferably made from extruded polyethylene or polypropylene.

The weatherstripping product shown in FIG. 19 has the center of the enlargement 152 formed by a foam core 158 filling the complete center of the enlargement. This product can be made with the apparatus of FIGS. 1 to 6 by modifying the folding stations to enable lengths of foam core of circular cross section to be fed into the folding stations on top of the substrate 22 and then the substrate folded around these foam cores with the formation of a fin or web portion between each core and the plane of the substrate 22. The welders 46 weld the two layers of this web portion together at 160 between the enlargement 152 and the substrate 22. The core 158 is preferably made from extruded polystyrene or polypropylene foam. Although the foamed core 158 is preferred, this center core could be made from a heavy denier yarn or from an extruded solid core.

Apart from the circular shape of the enlargement 152 of the weatherstripping products of FIGS. 18 and 19 providing better sealing properties, this enlargement also provides improved heat insulating value and provides stability against the central barrier fin creasing or folding.

Figure 20:
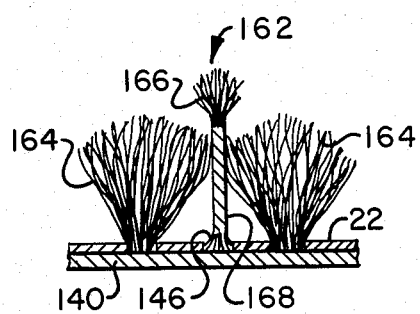
FIG. 20 is a cross section of a new weatherstripping product produced by the apparatus of FIG. 10.

FIGS. 19 and 20 show further new forms of weatherstripping produced by the embodiments of FIGS. 10 and 8, respectively. Both these products are designed to have improved frictional properties, i.e. less resistance to opening and closing a door or window, and improved sealing action.

The product of FIG. 20 is produced by the apparatus of FIG. 10 having a pair of needles 54 in the tufter head 52 for each needle 130 of the tufter head 128. The needle 130 tufts a row of pile which is converted by a pair of heated dies 134 into a center barrier fin 162, and then the pair of needles 54 tuft a row of cut pile 164 closely on each side of the barrier fin 162. However, the pile produced by the first tufter 128 is taller than the heated dies 134. Consequently, the top of this central row of pile remains as a short bushy pile top 166, and the remaining height of the central row of pile is converted to a film 168. The film 168 is attached at the bottom to the substrate 22 by fiber roots 146 as in FIG. 16. The short bushy pile top 166 extends above the two outside pile rows 164 to create improved sealing ability with low frictional drag.

Figure 21:
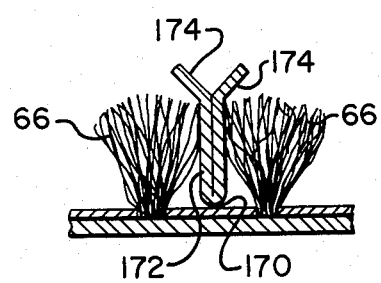
FIG. 21 is a cross section of a new weatherstripping product produced by the apparatus of FIG. 8.

The product of FIG. 21 is produced by the apparatus of FIG. 8 in a similar manner to the product of FIG. 17 with two outside rows 66 of cut pile and a barrier fin formed from a V folded strip, the latter being adhered at its fold 170 to the substrate 22. However, the V folded strip is made higher than the tufted rows 66 and is heat sealed together by heated dies at the exit end of the forming station 116. These heated dies have a height approximately equal to the height of the rows 66 so leaving free the extreme end portions 174 of the arms of the folded and sealed V. Between the junction of these end portions 174 and the fold 170 the barrier fin is formed by a sealed, double film portion 172. The central barrier fin thus has a Y configuration, with the freely extending arms 174 of the Y effecting a double sealing action in use. The film used to form this barrier fin can advantageously be a conjugate film of polyethylene and polypropylene, the polyethylene being located on the inside of the V when the sheet if folded. Polyethylene is then heat sealed to polyethylene at a temperature which does not affect the polypropylene layer.

Although all the above described products have been shown with cut pile, some or all of the pile rows can be formed as looped pile.

Also, in the embodiments of FIGS. 1, 8 and 10, the supply roll 24 of substrate can be transversely controlled by an edge guiding system if desired. A further edge guiding system may be positioned upstream of the tufter head 52, provided hunting between two or more edge guiding systems is avoided and there is sufficient distance between adjacent edge guiding systems to enable the substrate to be maintained flat. For example, the rolls 48, 50 can be transversely displaceable and form part of an edge guiding system.

The manner of forming a row of pile into a film by the dies 134 in FIG. 10 is described and shown in greater detail in our copending patent application Ser. No. 640,761 filed concurrently herewith and entitled "Weatherstripping Including Method And Apparatus For The Manufacturing Thereof", the disclosure in which is hereby incorporated herein by reference.

The apparatus of FIG. 10 and its manner of operation are described and shown in greater detail in our copending patent application Ser. No. 640,667 filed concurrently herewith and entitled "Tufting Process and Apparatus For Manufacturing Weatherstripping", the disclosure in which is hereby incorporated herein by reference.

It will be appreciated, therefore, that the present invention provides the formation of or attachment of various forms or barrier fins to the substrate in the absence of pile so allowing adequate space for forming or attaching the barrier fin. Subsequently, the pile is attached by tufting one or more rows of tufts on one or both sides of the barrier fin. It will also be appreciated, that the present invention provides the basis for a continuous process for producing pile weatherstripping with barrier fins by tufting.

The above described embodiments, of course, are not to be construed as limiting the breadth of the present invention. Modifications and other alternative constructions, will be apparent which are within the spirit and scope of the invention as defined in the appended claims.

What is claimed is:

1. A method of manufacturing weatherstripping, comprising:
   forming a barrier fin on a substrate;
   advancing the substrate with the barrier fin extending downwardly from the underside thereof past a tufter head having support means for supporting the substrate during tufting;
   passing the downwardly extending barrier fin through a channel in said support means while the substrate passes over and is supported by said support means; and
   tufting a row of tufts in the supported substrate along at least one side of the downwardly extending barrier fin.

2. The method of claim 1, comprising tufting a second row of tufts along the other side of the downwardly extending barrier fin, and guiding the substrate transversely to ensure alignment of the barrier fin between the two rows of tufts.

3. The method of claim 1, comprising applying a secondary backing to the tufted substrate on the opposite side thereof to said barrier fin, and thereafter slitting the substrate and secondary backing to form a strip of pile weatherstripping containing said barrier fin.

4. The method of claim 1, wherein said forming comprises folding said substrate to form said barrier fin from and integral with the substrate.

5. The method of claim 4, wherein said folding is effected by passing said substrate between two dies.

6. The method of claim 5, comprising gripping opposite edges of said substrate in a tenter frame and thereby controlling the position of said edges during said folding.

7. The method of claim 6, wherein during said folding one of said edges is maintained parallel to the direction of advancement of said substrate and the other of said edges converges towards said one edge.

8. The method of claim 6, wherein during said folding both of said edges converge towards each other.

9. The method of claim 5, comprising sequentially forming a plurality of barrier fins by sequentially folding said substrate, said subsequently slitting said substrate to form a plurality of strips of weatherstripping.

10. The method of claim 4, wherein said forming further comprises heat sealing.

11. The method of claim 4, further comprising ultrasonically welding the folded substrate to dimensionally stabilize said barrier fin before said tufting.

12. The method of claim 1, wherein said forming comprises adhering a strip of sheet material to said substrate.

13. The method of claim 12, comprising folding said sheet material before said adhering.

14. The method of claim 13, wherein said folding occurs below said substrate as the latter is advancing towards said tufter head, and the folded sheet material is fed upwardly to the advancing substrate and adhered to the underside thereof.

15. The method of claim 14, wherein said adhering comprises ultrasonic welding.

16. Apparatus for manufacturing weatherstripping, comprising:
   a tufter head having at least one needle;
   means for advancing a substrate past the tufter head;
   support means for supporting the substrate during tufting by said needle;
   said support means having a channel therein to accommodate a barrier fin extending downwardly from the underside of said substrate; and
   said needle being disposed to tuft alongside said barrier fin.

17. The apparatus of claim 16, comprising means, upstream of said tufter head, for forming the barrier fin on the underside of said substrate as said substrate is advanced by said advancing means towards said tufter head.

18. The apparatus of claim 17, wherein said forming means comprises folding dies.

19. The apparatus of claim 16, wherein said support means comprises a needleplate, and said channel comprises a groove in the top of said needleplate extending in the direction of advancement of said substrate.

20. Weatherstripping comprising:
- a strip of substrate having a barrier fin extending therefrom;
- a resilient row of pile attached to the substrate and extending along each side of said barrier fin;
- said barrier fin comprising sheet material folded upon itself and enveloping a core spaced from and extending parallel to said substrate, said core creating an enlargement along said barrier fin spaced from said substrate; and
- each said row of pile being shorter in height than said barrier fin and engaging under said enlargement to resiliently support said enlargement in position.

* * * * *